William W. Simmons
INVENTOR.

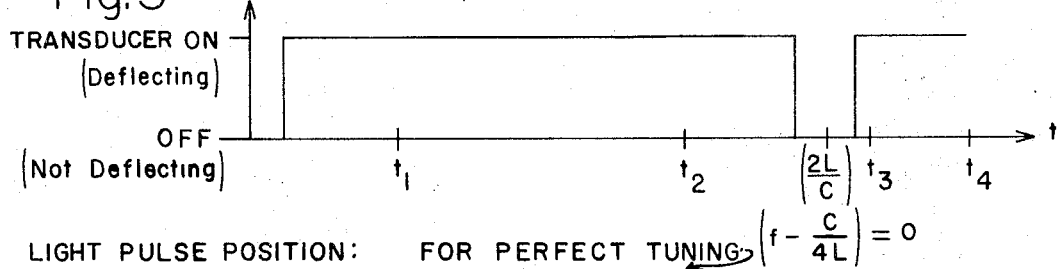
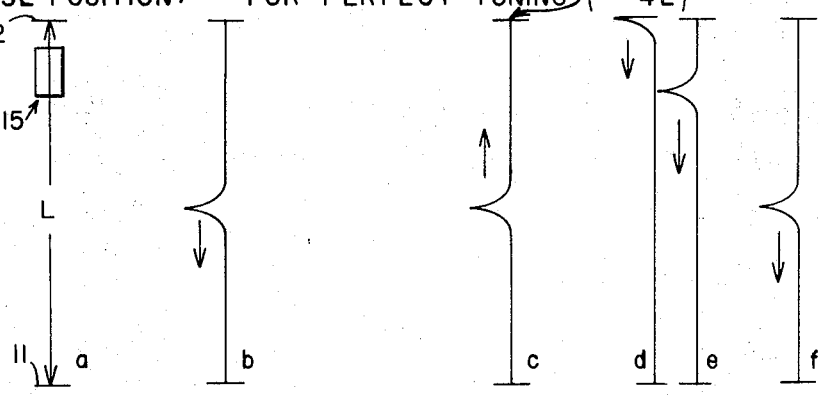
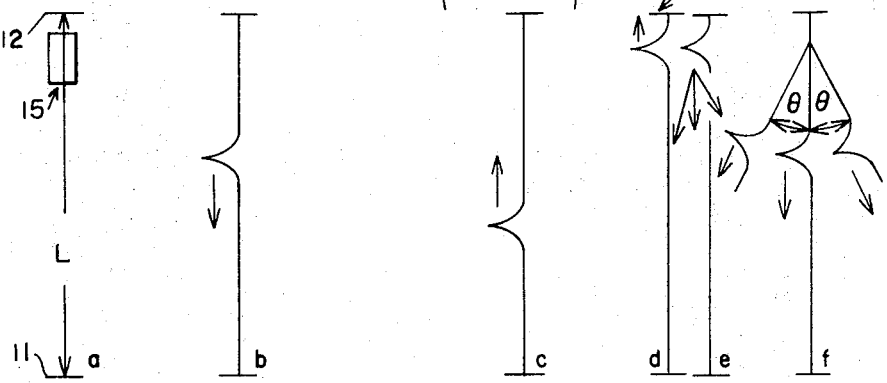

United States Patent Office 3,529,263
Patented Sept. 15, 1970

---

3,529,263
MEANS FOR EXTRACTING LIGHT FROM MODE-LOCKED LASERS
William W. Simmons, Palos Verdes Peninsula, Calif., assignor to TRW Inc., Redondo Beach, Calif., a corporation of Ohio
Filed June 16, 1967, Ser. No. 646,656
Int. Cl. H01s 3/10
U.S. Cl. 331—94.5           4 Claims

ABSTRACT OF THE DISCLOSURE

An ultrasonic transducer is interposed in the resonant cavity of a laser. Means are provided for exciting the ultrasonic transducer at a preselected frequency, thereby creating and ultrasonic standing wave which diffracts light energy from the laser cavity.

BACKGROUND OF THE INVENTION

This invention relates generally to systems for controlling the output of a laser and, more particularly, to a means for extracting light from a mode-locked laser by diffracting the light beam from an ultrasonic standing wave.

Light is removed from laser cavities by partially silvering the end reflectors of the laser cavity so that a portion of the light is taken out of, or transmitted from the cavity area. This method of extracting light is fixed in the sense that the power output is a function of reflectivity or transmissivity and this parameter cannot be readily changed. Another method of deflecting or transmitting light from a resonant cavity involves the use of a Brewster window. This method also suffers from the power limitation. A mechanical method of deflecting light from the cavity is disclosed in U.S. Pat. No. 3,299,368, entitled "Laser Light Gate with Piezoelectric Crystal" by A. A. Klebba. In the device of that patent, the mechanism disclosed is primarily used to gate the laser on and off; but in the process of doing this, a portion of the light generated in the cavity is reflected or deflected out of the cavity area. The deflection is accomplished by using a piezoelectric action to vary the contour of one of the end reflectors in the laser resonant cavity. When the reflector is flat and perpendicular to the axis of the laser rod, lasing action can take place whenever the laser is pumped since the reflector reflects the internal electromagnetic radiation back to the laser rod. When the contour of the reflector's surface is curved outward, all of the internal electromagnetic radiation is not returned and lasing action does not occur. That portion of the energy which does not return is transmitted out of the cavity area. There does exist a problem with this particular device in that the light is scattered at an uncontrolled angle and hence is not usable for excitation of some external device. Aside from the elimination of the disadvantages previously mentioned, it would be advantageous to have a laser cavity wherein no light is coupled out of the ends of the laser so that the cavity Q can be made as high as possible with consequent increases in flexibility of design and overall efficiency of operation.

SUMMARY OF THE INVENTION

In a preferred embodiment of this invention, an ultrasonic transducer is interposed in the resonant cavity of a laser. Means are provided for exciting the ultrasonic transducer to generate an ultrasonic standing wave at a predetermined frequency having a propagation path perpendicular to and intersecting the axial path of the laser cavity. The laser is operated in a mode-locked condition when the ultrasonic standing waves are generated at a frequency approximately equal to the frequency of the light pulse train. By proper adjustment of the optical cavity length L, and the ultrasonic frequency $f$, near the mode-locking condition which is $f=c/4L$ (where $c$ is the speed of light), a usable portion of the light pulse train can be extracted at a predetermined angle from the cavity.

Accordingly, it is a primary object of the present invention to provide a unique means for extracting light from a laser cavity.

It is a further object of the present invention to provide a means for extracting light from a laser cavity utilizing an ultrasonic transducer.

It is a further object of the present invention to provide a light deflector for a resonant cavity utilizing ultrasonic standing waves as the deflecting element.

The foregoing and other objects and features of the present invention will be more apparent and better understood when taken in conjunction with the following description and accompanying drawings, throughout which like characters indicate like parts, and which drawings form a part of this application.

BRIEF DESCRIPTION OF THE DRAWINGS

FIG. 3 is a chart illustrating the operation of the transducer with respect to time that is helpful in understanding the theory and operation of the invention;

FIGS. 4a through 4f are light pulse waveforms operating on the time base of FIG. 3; and FIG. 5a through 5f are additional light pulse waveforms operating on the time base of FIG. 3.

DESCRIPTION OF THE PREFERRED EMBODIMENT

Figure 1:
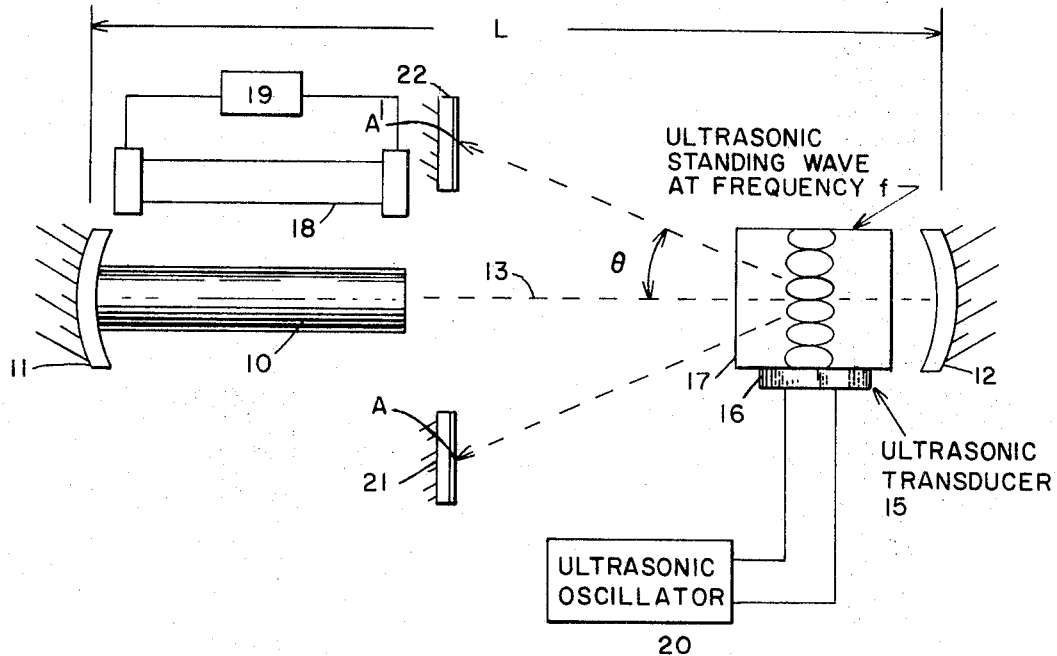
FIG. 1 is a schematic of the preferred embodiment of the present invention.

Referring now to FIG. 1, a laser system is shown which includes an active laser element 10 such as a ruby rod, along with reflectors 11 and 12 which are spaced apart a distance L to define a resonant laser cavity. Reflectors 11 and 12 are totally reflective and may be curved or flat. The reflectors are positioned symmetrically on the axis 13 of the laser rod 10. A flash tube 18 connected to a power source 19, supplies pumping energy to excite the laser in the well-known fashion. Ultrasonic transducer 15 is interposed in the laser cavity between the reflector 12 and the laser rod 10, and near to reflector 12. The ultrasonic transducer 15 is comprised of an ultrasonic piezoelectric compression driver 16 for generating ultrasonic waves and a quartz cavity 17 attached to the driver 16 for supporting ultrasonic standing waves in the cavity. The ultrasonic driver 16 is excited by means of an oscillator 20. Mirrors 21 and 22 are positioned at points A and A' which are points along a path that is located at an angle θ with respect to the axis 13 of the laser element 10.

Figure 2:
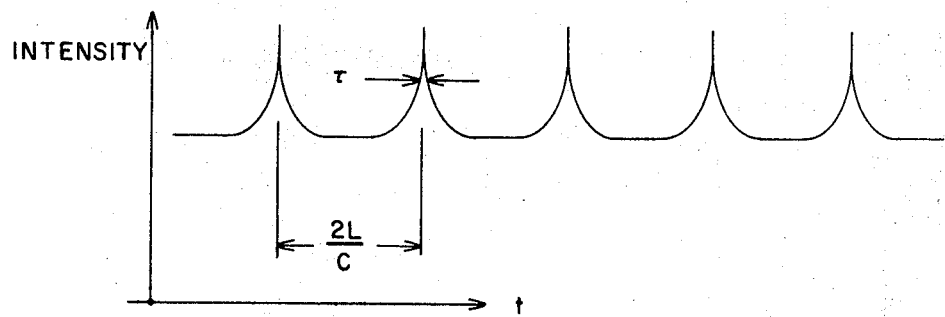
FIG. 2 is a graph illustrating the intensity of the light pulses vs. time.

In FIG. 2, the output of a mode-locked laser is illustrated with the intensity of the light pulses appearing along the vertical scale and time appearing along the horizontal scale. It consists of a train of high energy light pulses having a period of $2L/c$, where $c$ is the speed of light, L is the optical path length of the light between the reflectors 11 and 12, and τ represents the average width of the light pulses. By proper adjustment of the cavity length L and the transducing frequency $f$, near the mode-locking condition, $f=c/4L$, the light pulse train can be made to emerge at points A and A'. Either the frequency $f$ or the spacing of the reflectors L may be varied to achieve deflection of energy from the ultrasonic standing wave.

Referring now to FIGS. 3, 4a through 4f, and 5a through 5f, which are superimposed events taking place in the laser cavity at equal points in time. In other words, the time base for FIG. 3 is the same base for FIGS. 4a through 4f and FIGS. 5a through 5f. FIG. 3 illustrates the times when the transducer 15 is on and when it is off with respect to time. Referring now to FIG. 4, where the frequency $f$ is exactly equal to $c/4L$. In FIG. 4a, the laser cavity is depicted as having the reflectors 11 and 12 spaced apart a distance L with the transducer 15 interposed between the reflecting surfaces of the reflector. The transducer 15 is turned on at a frequency of $f=c/4L$. This causes the laser to be mode-locked. When this occurs, the laser light within the optical cavity is compressed into high intensity light spikes traveling back and forth between the end reflectors. The train of light pulses was illustrated in FIG. 2. For purposes of analysis, one particular pulse will be followed through a cycle. In FIG. 4b, the pulse, at time $t_1$ is traveling toward the reflector 11 and the transducer 15 is on. In FIG. 4c, the pulse at time $t_2$ is traveling toward the reflector 12 with the transducer on. In FIG. 4d, the pulse at time $c/2L$ has already passed through the transducer which was off, and reached the reflector 12. In FIG. 4e, the pulse at time $t_3$ has traversed through the transducer 15 with the transducer off; and in FIG. 4f, it continues on toward the reflector 11. In this particular sequence of operation, the frequency at which the transducer turned off and on is equal to exactly $c/4L$, so in this condition no light is deflected from the cavity. Referring now to FIGS. 5a through 5f, in these particular figures, the frequency $f$ is slight mistuned from $c/4L$. In FIG. 5b, the pulse at time $t_1$ is traveling toward the reflector 11. In FIG. 5c, the pulse at time $t_2$ is traveling back toward the transducer 15 and the reflector 12. At this time, the transducer is off and the pulse passed through the transducer undisturbed. In FIG. 5d, the pulse, at time $c/2L$, has almost reached the reflector 12. In FIG. 5e, the pulse is in the transducer 15 and the transducer 15 is on and a portion of the pulse starts to deflect out of the cavity with a portion of the energy continuing on toward the reflector 11. In FIG. 5f, transducer 15 is still on and the pulses of energy are deflected at an angle $\theta$ out of the cavity. The angle $\theta$ at which the pulses of light will be deflected is determined by the formula $$\theta = \frac{\lambda f}{2v}$$

where $\lambda$ is the wavelength of the laser light, $v$ is the ultrasonic velocity in fused quartz, and $f$ is the frequency of the ultrasonic standing wave.

In the embodiment disclosed herein, the ultrasonic transducer propagates the ultrasonic wave in a plane substantially perpendicular to the axis of the laser cavity. This in turn results in the light pulses being deflected from the cavity in a plane defined by the laser axis and the direction of propagation of the standing waves. It would be obvious to one skilled in the art with the teachings of this invention to place a second ultrasonic transducer with the direction of propagation of the standing wave orthogonal with respect to the laser axis and the first transducer so as to deflect the pulses in a second plane orthogonal to the first named plane. This particular technique could be utilized for numerous transducers positioned at different angles around the laser axis.

To reiterate the advantages of the present invention, the reflectors of the laser cavity can be made totally reflecting, thereby allowing the cavity to be operated at a higher Q. The power output from the laser is increased above that which would be available if the pulses were taken out of the cavity through the reflectors.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

What is claimed is:

1. A laser system including apparatus for extracting electromagnetic radiation therefrom, said system comprising:
    (a) an active laser element;
    (b) means for energizing said laser element to develop a beam of electromagnetic radiation;
    (c) two reflectors, each being totally reflective to the electromagnetic beam, said reflectors being disposed to enclose said laser element for providing a resonant cavity for said laser;
    (d) an ultrasonic transducer disposed in said resonant cavity; and
    (e) an oscillator coupled to said ultrasonic transducer for generating an ultrasonic standing wave in said transducer, the frequency of said oscillator being approximately equal to and mistuned from that determined by $f=c/4L$, where $c$ is the velocity of light and L is the optical path length between said reflectors, whereby substantially the entire energy of the electromagnetic beam is deflected for further utilization.

2. A laser system as defined in claim 1 wherein said ultrasonic transducer is so oriented that said ultrasonic standing wave is disposed substantially at right angles to the direction of propagation of the electromagnetic beam.

3. A laser system as defined in claim 1 which is operated in mode-locked condition.

4. A laser system as defined in claim 1 wherein said ultrasonic transducer consists of a quartz cavity for developing the ultrasonic standing wave and a piezoelectric driver coupled to said quartz cavity.

References Cited
UNITED STATES PATENTS

| | | | |
|---|---|---|---|
| 3,297,876 | 1/1967 | De Maria | 331—94.5 |
| 3,412,251 | 11/1968 | Hargrove | 331—94.5 |

WILLIAM L. SIKES, Primary Examiner

U.S. Cl. X.R.

350—161